(12) United States Patent
Chatterjee et al.

(10) Patent No.: US 9,560,574 B2
(45) Date of Patent: Jan. 31, 2017

(54) USER EQUIPMENT AND METHOD FOR TRANSMIT POWER CONTROL FOR D2D TRANMISSIONS

(71) Applicant: Intel IP Corporation, Santa Clara, CA (US)

(72) Inventors: Debdeep Chatterjee, Santa Clara, CA (US); Gang Xiong, Beaverton, OR (US); Huaning Niu, Milpitas, CA (US); Seunghee Han, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 170 days.

(21) Appl. No.: 14/482,060

(22) Filed: Sep. 10, 2014

(65) Prior Publication Data

US 2015/0223141 A1 Aug. 6, 2015

Related U.S. Application Data

(60) Provisional application No. 61/933,873, filed on Jan. 31, 2014.

(51) Int. Cl.
| | | |
|---|---|---|
| *H04W 4/00* | (2009.01) | |
| *H04W 40/24* | (2009.01) | |
| *H04L 5/00* | (2006.01) | |
| *H04W 52/38* | (2009.01) | |

(52) U.S. Cl.
CPC .......... *H04W 40/246* (2013.01); *H04L 5/0092* (2013.01); *H04W 52/383* (2013.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 2013/0310103 A1* | 11/2013 | Madan | ................ | H04W 52/242 455/522 |
| 2014/0094122 A1* | 4/2014 | Etemad | ................ | H04W 76/02 455/41.2 |
| 2014/0141789 A1* | 5/2014 | Tarokh | ................ | H04W 72/02 455/450 |
| 2014/0185530 A1* | 7/2014 | Kuchibhotla | ....... | H04W 76/023 370/329 |
| 2014/0187283 A1* | 7/2014 | Nimbalker | .......... | H04W 72/048 455/550.1 |
| 2014/0204847 A1* | 7/2014 | Belleschi | ............ | H04W 76/023 370/329 |

(Continued)

OTHER PUBLICATIONS

"Evaluation on WAN Impact of D2D discovery", 3GPP TSG RAN WG1 Meeting #74bis, R1-134191, Samsung, (Oct. 2013), 6 pgs.

*Primary Examiner* — Otis L Thompson, Jr.
(74) *Attorney, Agent, or Firm* — Schwegman Lundberg & Woessner, P.A.

(57) ABSTRACT

Embodiments of user equipment (UE) and methods for transmit power control for device-to-device (D2D) discovery operations and D2D communication in a cellular network are generally described herein. In some embodiments, the UE may configure a discovery signal for transmission on discovery resources from a configured resource pool for D2D discovery. The discovery signal may be transmitted at a transmit power level based on a relative location of the discovery resources with respect to uplink cellular resources in the frequency domain.

20 Claims, 3 Drawing Sheets

(56) References Cited

U.S. PATENT DOCUMENTS

| | | | | |
|---|---|---|---|---|
| 2014/0206322 A1* | 7/2014 | Dimou | H04W 4/005 | 455/414.1 |
| 2014/0321423 A1* | 10/2014 | Kalhan | H04W 76/023 | 370/330 |
| 2014/0334354 A1* | 11/2014 | Sartori | H04W 8/005 | 370/280 |
| 2014/0370904 A1* | 12/2014 | Smith | H04W 8/005 | 455/450 |
| 2015/0043448 A1* | 2/2015 | Chatterjee | H04W 8/005 | 370/329 |
| 2015/0085764 A1* | 3/2015 | Xiong | H04W 24/04 | 370/329 |
| 2015/0085818 A1* | 3/2015 | Huang | H04L 5/0037 | 370/330 |
| 2015/0139006 A1* | 5/2015 | Seo | H04J 11/005 | 370/252 |
| 2015/0173029 A1* | 6/2015 | Fujishiro | H04W 52/383 | 370/328 |
| 2015/0208332 A1* | 7/2015 | Baghel | H04W 48/16 | 370/255 |
| 2015/0245193 A1* | 8/2015 | Xiong | H04W 76/023 | 370/328 |
| 2015/0271657 A1* | 9/2015 | Xiong | H04W 8/005 | 370/329 |
| 2015/0327180 A1* | 11/2015 | Ryu | H04W 52/18 | 370/329 |
| 2016/0014589 A1* | 1/2016 | Niu | H04W 40/244 | 370/329 |
| 2016/0050635 A1* | 2/2016 | Choi | H04W 52/383 | 370/254 |

* cited by examiner

USER EQUIPMENT AND METHOD FOR TRANSMIT POWER CONTROL FOR D2D TRANMISSIONS

PRIORITY CLAIM

This application claims priority under 35 U.S.C. 119(e) to U.S. Provisional Patent Application Ser. No. 61/933,874, filed Jan. 31, 2014 [reference number 4884.135PRV (P63776Z)] which is incorporated herein by reference in its entirety.

TECHNICAL FIELD

Embodiments pertain to wireless communications. Some embodiments relate to cellular networks such as 3GPP LTE (Long Term Evolution) networks and LTE-Advanced (LTE-A) networks. Some embodiments relate to direct device-to-device (D2D) communication. Some embodiments relate to D2D discovery in LTE networks. Some embodiments relate to user equipment (UE) enabled for proximity services (ProSe-enabled UEs). Some embodiments relate to transmit power control (TPC) for D2D communications. Some embodiments relate to interference control.

BACKGROUND

Support for direct D2D communication as an integrated part of a wireless communication network is currently being considered for the further evolution of LTE networks. With direct D2D communication, user equipment (UE) may communicate directly with each other without involvement of a base station or an enhanced node B (eNB). One issue with D2D communication is device discovery to enable D2D communications. Device discovery involves discovering one or more other discoverable UEs within communication range for D2D communication. Device discovery also involves being discovered by one or more other discovering UEs within communication range for D2D communications. There are many unresolved issues with respect to device discovery for D2D communication including the signaling used for device discovery and the discovery information conveyed during device discovery.

One issue with D2D discovery and D2D communication is interference with the communications of the cellular network (e.g., communications between a UE and an eNB). This is particularly an issue since the power level of D2D signals may not controlled by an eNB. For D2D discovery, UEs may desire to transmit discovery signals at maximum transmit power to increase the probability of being discovered by other devices. As a consequence of the discovery signal transmissions not being power controlled to the eNB, there may be significant impact from interference due to in-band emissions (IBE) due to the non-ideal characteristics of RF components and modulation process. Additional asynchronous interference may also result due to transmission time mismatch between uplink cellular transmissions which are transmitted with an application of a timing advance (TA) and D2D discovery signal transmissions which are transmitted without a timing advance (i.e., since discovery signal transmissions may be from UEs that are idle mode that do not have any assigned TA).

Thus there are general needs for devices and methods that reduce interference from D2D discovery and D2D communications. There also are general needs for devices and methods for transmit power control (TPC) for D2D discovery and D2D communications. There also are general needs for devices and methods to control the level of interference from D2D discovery signals.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein are directed to interference control. Some embodiments disclosed herein may provide transmit power control (TPC) for D2D discovery transmissions so as to minimize the impact of in-band emissions (IBE) from discovery transmissions on wireless access network (WAN) resources that may be frequency multiplexed with a D2D discovery zone (DZ) or D2D data region within the network coverage region. Embodiments may further provide protection for uplink cellular reception at an eNB through a TPC mechanism that may control the level of interference within the D2D discovery zone. In accordance with embodiments, TPC for discovery signal transmissions may be enhanced by exploiting the fact that the primary interference from in-band emissions may depend on the relative location of the physical resource block(s) PRB(s) carrying the D2D signals and the PRBs in the uplink WAN region allowing different levels of power control depending on the transmission PRBs for the D2D signal (e.g., relaxed constraints may be allowed for the transmissions on the PRBs that are further away from the UL WAN resources). In some embodiments, these optimizations may help realize the maximum efficiency of the D2D discovery or D2D data broadcast operations that aim to reach the maximum number of receivers with a sufficiently high signal-to-noise ratio (SNR) for maximal range of device discovery and communication. In some embodiments, TPC for discovery signal transmissions may also be based on a target SNR and a path loss to eNB to help minimize impact on control channel reception from in-band emissions. These embodiments are discussed in more detail below.

Figure 1:
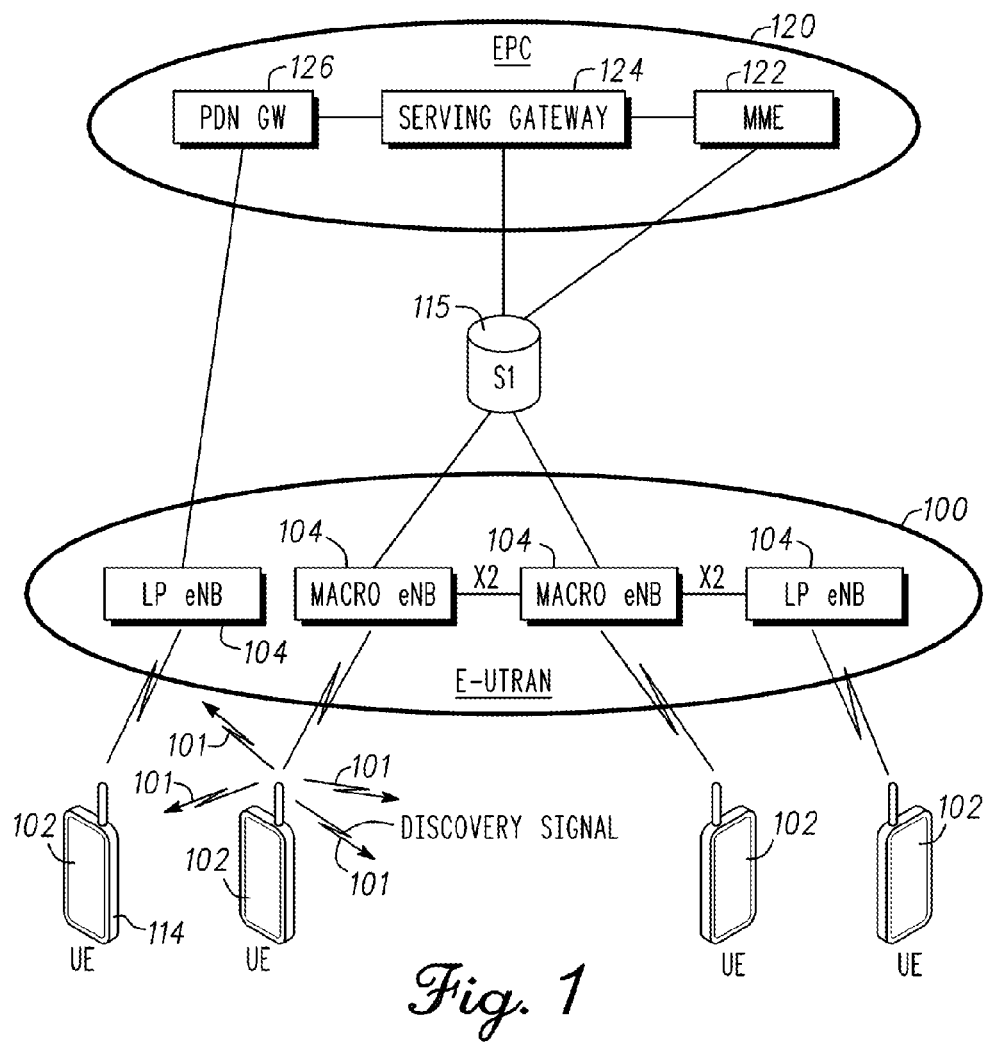
FIG. 1 shows a portion of an end-to-end network architecture of an LTE network in accordance with some embodiments.

FIG. 1 shows a portion of an end-to-end network architecture of an LTE network in accordance with some embodiments. The network architecture comprises a radio access network (RAN) (e.g., as depicted, the E-UTRAN or evolved universal terrestrial radio access network) 100 and a core network 120 (e.g., shown as an evolved packet core (EPC)) coupled together through an S1interface 115. For convenience and brevity sake, only a portion of the core network 120, as well as the RAN 100, is shown.

The core network 120 includes mobility management entity (MME) 122, serving gateway (serving GW) 124 and packet data network gateway (PDN GW) 126. The RAN also includes enhanced node Bs (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100 and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN and may be a key node for policy enforcement and charging data collection. It may also provide an anchor point for mobility with non-LTE accesses. The external PDN may be any kind of IP network as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management.

The S1interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2 -C and X2 -U. The X2 -C is the control plane interface between the eNBs 104, while the X2 -U is the user plane interface between the eNBs 104.

With cellular networks, LP cells are typically used to extend coverage to indoor areas where outdoor signals do not reach well or to add network capacity in areas with very dense phone usage, such as train stations. As used herein, the term LP eNB refers to any suitable relatively lower power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically thirty to fifty meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.) or more recently in-aircraft. A picocell eNB can generally connect through the X2 link to another eNB such as a macro eNB through its base station controller (BSC) functionality. A LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point, base station or enterprise femtocell.

In some LTE embodiments, a physical downlink shared channel (PDSCH) carries user data and higher-layer signaling to a UE 102. The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs within a cell) is performed at the eNB 104 based on channel quality information fed back from the UEs 102 to the eNB 104, and then the downlink resource assignment information may be sent to a UE 102 on a physical downlink control channel (PDCCH) used for (and possibly assigned to) the UE 102.

The PDCCH uses CCEs (control channel elements) to convey the control information. Before being mapped to resource elements, the PDCCH complex-valued symbols may be first organized into quadruplets, which may be permuted using a sub-block inter-leaver for rate matching. Each PDCCH is transmitted using one or more of CCEs, where each CCE may correspond to nine sets of four physical resource elements known as resource element groups (REGs). Four QPSK symbols are mapped to each REG. The PDCCH may be transmitted using one or more CCEs, depending on the size of DCI and the channel condition. There may be four or more different PDCCH formats defined in LTE with different numbers of CCEs (e.g., aggregation level L=1, 2, 4, or 8).

In accordance with some embodiments, a UE102 may be a ProSe-enabled UE (e.g., enabled for proximity services) arranged for device-to-device (D2D) communications including D2D discovery of other UEs for direct D2D communication. In accordance with these embodiments, a UE 102 may configure a discovery signal 101 for transmission on discovery resources that are allocated of selected for D2D discovery. The discovery signal 101 may be configured to be transmitted at a transmit power level based on a relative location of the discovery resources with respect to uplink cellular resources in the frequency domain. In these embodiments TPC for D2D communications based on a relative location of the discovery resources with respect to uplink cellular resources may help reduce interference with uplink cellular transmissions. For example, in some embodiments the impact of in-band emissions from discovery transmissions on cellular resources may be minimized. These embodiments are described in more detail below.

Figure 2A:
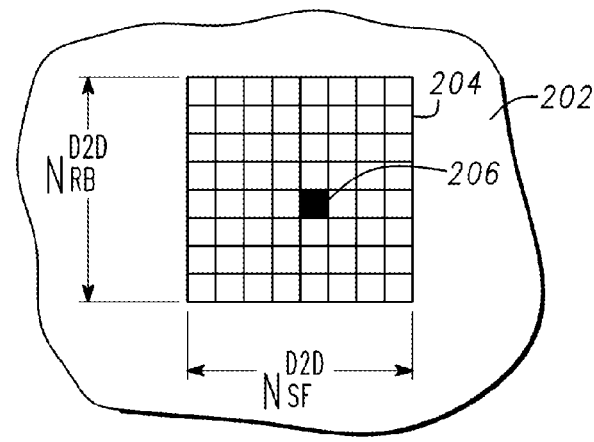
FIG. 2A shows a structure for a resource grid including a discovery zone for D2D communications in accordance with some embodiments.

FIG. 2A shows a structure for a resource grid including a discovery zone for D2D communications in accordance with some embodiments. The depicted resource grid may illustrate be the physical resource in the downlink or uplink in each slot. The smallest time-frequency unit in a resource grid is denoted as a resource element (RE). The resource grid comprises a number of resource blocks (RBs) which describe the mapping of certain physical channels to resource elements. Each resource block comprises a collection of resource elements and in the frequency domain, represents the smallest quanta of resources that may be allocated, although the scope of the embodiments is not limited in this respect. There are several different physical channels that are conveyed using such resource blocks.

The resource grid illustrated in FIG. 2A may comprise an LTE operation zone 202 which may comprise a plurality of physical RBs (PRBs) for use by the RAN 100. The LTE operation zone 202 may include a discovery zone 204. Resources of the discovery zone 204 may be allocated for D2D discovery and in some embodiments, D2D communications. In some embodiments, the discovery zone 204 may be a resource pool comprising discovery resources.

A PRB may be associated with a particular slot of a subframe in the time dimension and a particular group of frequency subcarriers in the frequency dimension. Each PRB, for example, may be identified by a RB index and a subframe index. In some embodiments, a discovery signal 101 may be transmitted within M subframes of N resources blocks where M and N are at least one and may be greater than one. These embodiments are described in more detail below.

In some embodiments, a PRB may comprise twelve sub-carriers in the frequency domain by 0.5 ms (i.e., one slot) in the time domain. The PRBs may be allocated in pairs (in the time domain), although this is not a requirement. In some embodiments, a PRB may comprise a plurality of resource elements (REs). A RE may comprise one sub-carrier by one symbol. When a normal CP is used, a RB contains seven symbols. When an extended CP is used, the RB contains six symbols. A delay spread that exceeds the normal CP length indicates the use of extended CP. Each subframe may be one millisecond (ms) and one frame may comprise ten such subframes.

Embodiments disclosed herein may be applied to two different approaches in D2D discovery: restricted or closed D2D discovery and open D2D discovery. Restricted or closed D2D discovery may apply to use cases in which a discoverable device may be discovered only by a select set of ProSe enabled discovering devices. A further implication of closed device discovery is consideration of scenarios wherein a discovering device tries to discover particular ProSe enabled device(s) (one or many from a set of ProSe enabled devices). Thus, for this use case, a discovering device would be assumed to know the ProSe enabled device it wishes to discover in its proximity.

Contrary to closed D2D discovery, open device discovery considers use cases wherein a discoverable device may want itself to be discovered by all ProSe enabled devices in its proximity. From the perspective of the discovering device, open device discovery implies that a discovering device may not be assumed to be aware of the identity of other ProSe enabled devices prior to discovery. Consequently, the device discovery mechanism for open discovery should aim towards discovering as many ProSe enabled devices in its proximity as possible.

For open D2D discovery, an eNB 104 may have a limited control on the discovery process among the UEs 102. In particular, an eNB 104 may periodically allocate certain discovery resources in the form of D2D discovery zones 204 for a UE 102 to transmit discovery information. The number of resource blocks for discovery signal transmission in open D2D discovery design, which is denoted as $L_{RB}^{D2D}$, may be one or more, depending on the payload size and the overall discovery performance requirements.

In the examples illustrated below, the discovery zones may be periodic with each discovery zone 204 comprising some RBs in the frequency domain and several subframes in time domain. In FIG. 2A, $N_{RB}^{D2D}$, $n_{RB}^{start}$, $N_{SF}^{D2D}$ and $n_{SF}^{start}$ are denoted as the number of allocated RBs, the starting RB index and the number of subframes, the starting subframe index of each discovery zone, respectively. The information regarding the partitioning of the D2D discovery zones (such as discovery zone 204) may be semi-statically signaled by the eNB 104 using radio-resource control (RRC) signaling or by system information blocks (SIBs) for within network coverage scenarios. For a partial network coverage scenario, such information may be forwarded by an in-network coordinator UE to a UE that may be outside network coverage.

In accordance with embodiments, an eNB 104 may periodically allocate certain discovery resources in the form of D2D discovery regions for a UE 102 to transmit the discovery information. The discovery information may be in the form of discovery sequence or discovery packet with payload information or a combination of both. The discovery signal 101 may be a discovery packet and may include a message portion (e.g., a payload) and a sequence portion. The sequence portion may include a sequence that is a demodulation reference signal (DM-RS) of the message portion. Other discovery signal structures may also be used. The number of resource blocks used for discovery signal transmission in open D2D discovery design, which is denoted as $L_{RB}^{D2D}$, may be one or more, depending on the payload size and the overall discovery performance requirement.

In some embodiments, the discovery zone 204 may comprise a contiguous set of physical resource blocks (PRBs) spanning up to the entire system bandwidth, except certain PRB-pairs at the band-edges reserved for scheduling of UL cellular (UL WAN) transmissions (e.g., uplink cellular resources 208). In some embodiments, these UL WAN transmissions may include physical uplink control channel (PUCCH) transmissions at the band-edges or physical uplink shared channel (PUSCH) transmissions in addition to PUCCH transmissions at the band-edges. In general, other UL WAN transmissions such as physical random-access channel (PRACH) transmissions may be allowed in the PUSCH region. This reservation of resources for UL WAN transmissions may be used to minimize the impact on cellular downlink an uplink performance.

Figure 2B:
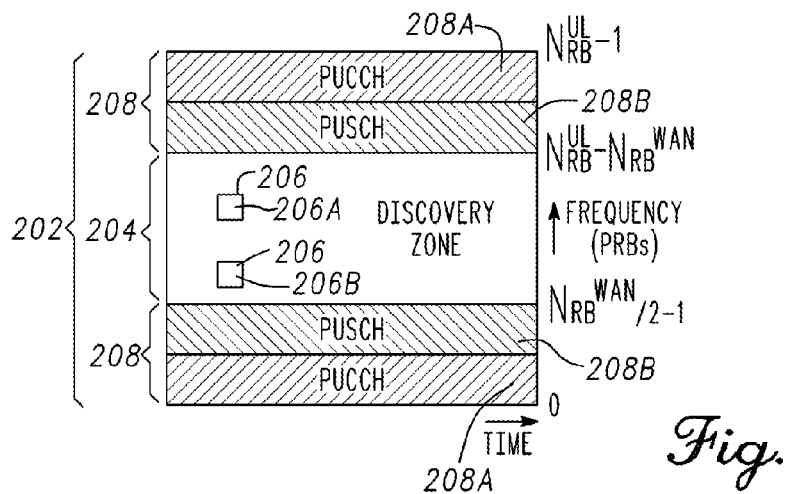
FIG. 2B shows a structure for a resource grid including a discovery zone for D2D communications in accordance with some other embodiments.
Figure 2C:
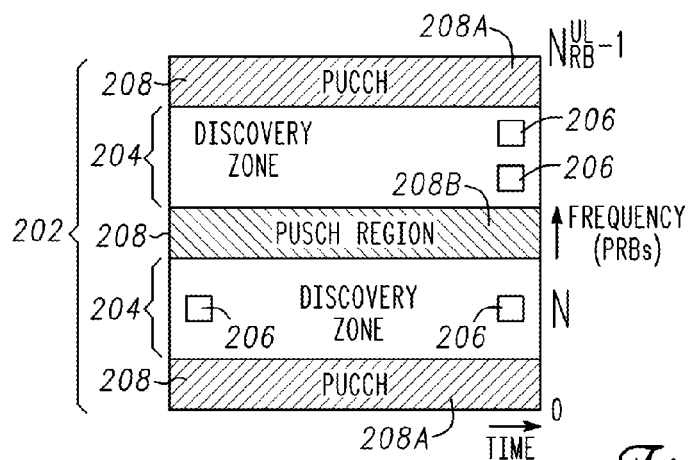
FIG. 2C shows a structure for a resource grid including a discovery zone for D2D communications in accordance with some other embodiments.

FIG. 2B shows a structure for a resource grid including a discovery zone for D2D communications in accordance with some other embodiments. FIG. 2C shows a structure for a resource grid including a discovery zone for D2D communications in accordance with yet some other embodiments. As illustrated in FIGS. 2B and 2C, the discovery zone 204 may reside within the LTE operation zone 202. The discovery zone 204 may be a resource pool (i.e., a discovery resource pool) that may comprise a plurality of physical resource blocks (PRBs). PRBs of the discovery zone 204 may be used for D2D discovery including transmission of discovery signals 101 and for D2D communication (i.e., direct communications between UEs). Uplink cellular resources 208 may be reserved for non-D2D communications, such as PUCCH, a PUSCH and PRACH. In the examples illustrated in FIG. 2B and FIG. 2C, uplink cellular resources 208 may include a PUCCH region 208A and a PUSCH region 208B. In FIG. 2B, the PUCCH region 208A and the PUSCH region 208B may be located at or near the band edges and the central region may be allocated, at least periodically, for to the discovery zone 204. In FIG. 2C, the PUCCH region 208A may be located at or near the band edges and the central region may include the PUSCH region 208B. In the example of FIG. 2C, the regions in between the PUCCH region 208A and the PUSCH region 208B may be allocated, at least periodically, for to the discovery zone 204. As shown in FIGS. 2C and 2D, the multiplexing of discovery zone and the UL WAN region occurs within the system bandwidth 202. In FIG. 2B, $N_{RB}^{UL}$ and $N_{RB}^{WAN}$ represent the number of RBs for uplink transmission and UL WAN transmissions, respectively. In the examples described herein, $N_{RB}^{WAN}$ is assumed to be an even number although this is not a requirement as embodiments are extendable to odd values of $N_{RB}^{WAN}$ as well.

In accordance with embodiments, a ProSe-enabled UE 102 may configure a discovery signal 101 (FIG. 1) for transmission on discovery resources 206 allocated for D2D discovery. The discovery signal 101 may be transmitted at a transmit power level based on a relative location of the discovery resources 206 with respect to uplink cellular resources 208 in the frequency domain. In some embodiments, the discovery signal 101 may be transmitted at a lower transmit power level on the discovery resources 206 (i.e., discovery resources 206B) that are closer in frequency to the uplink cellular resources 208 and at a higher transmit power level on the discovery resources 206 (i.e., discovery resources 206A) that are further in frequency from the uplink cellular resources 208. The uplink cellular resources include resources allocated to one or more of PUCCH, a PUSCH and a PRACH, although the scope of the embodiments is not limited in this respect. By reducing transmit power levels of D2D communications that are closer in frequency to uplink cellular communications, the effect of in-band emissions on the uplink cellular communications from the D2D communications may be reduced.

In-band emissions may include three main elements (other than spurs): general IBE, carrier leakage, and IQ leakage. For a resource partitioning between D2D and cellular operations (UL WAN) as shown in FIG. 2B in which the D2D region occupies a central part of the spectrum flanked by the UL WAN resources, the carrier leakage and IQ leakage components of IBE may be expected to only have an effect within the D2D region as long as the UL WAN resources are symmetric about the D2D region. As discussed above, when a ProSe-enabled UE transmits a discovery signal 101 at maximum transmit power in the discovery zone 204, it may introduce interference to the UL WAN region due to IBE. In an extreme case when most or all the discovery resources are occupied, the accumulated interference level at UL WAN region may be considerably high. Consequently, an eNB 104 may not be able to properly decode PUCCH or the PUSCH transmissions correctly thus having adverse impact on the normal WAN operation. Some of the embodiments for transmit power control for D2D discovery disclosed herein may help to reduce and/or minimize the impact on the UL WAN (PUCCH, PUSCH, PRACH) decoding performance.

Although many embodiments disclosed herein refer to D2D discovery signal transmission, embodiments disclosed herein are also applicable to transmission of D2D communication signals. In these embodiments, D2D communication signals may also be transmitted at a transmit power level based on a relative location of the D2D data communication resources used for transmission of the D2D communication signals with respect to uplink cellular resources 208.

In some embodiments, the discovery resources within the discovery zone 204 may be allocated by the eNB 104 (e.g., for Type 2 D2D discovery) or randomly selected from a configured resource pool (e.g., for Type 1 D2D discovery). In these embodiments, a UE 102 may be configurable by the eNB 104 for either Type 1 D2D discovery or Type 2 D2D discovery. When configured for Type 1 D2D discovery, resources for transmission of the discovery signal 101 may be allocated by the eNB 104 on a non-UE specific basis. When configured for Type 2 D2D discovery, specific resources for transmission of the discovery signal 101 may be allocated by the eNB 104 to the UE 102. Type 2 discovery may include Type 2A discovery in which resources are allocated for each specific transmission instance of discovery signals and Type 2B discovery in which resources are semi-persistently allocated for discovery signal transmission. In some embodiments, D2D discovery may operate in the UL spectrum (e.g., for frequency-division duplexing (FDD)) or UL subframes of the cell providing coverage (e.g., for time-division duplexing (TDD) except for out of coverage scenarios). In accordance with some embodiments, D2D transmission and reception does not use full duplex on a given carrier, although the scope of the embodiments is not limited in this respect.

In accordance with some embodiments, the transmit power level may be reduced in accordance with a transmit power level offset (i.e., a transmit power back off value) that is based at least in part on a number of resource blocks from the uplink cellular resources 208. In these embodiments, the transmit power level may also be based at least in part on a path loss between the UE and the eNB. The path loss, for example, may be measured prior to transmission of the discovery signal 101, although this is not a requirement. These embodiments are described in more detail below.

In some embodiments, little or no transmit power level offset is used for the transmission of a discovery signal 101 on RBs that are at least a predetermined number of RBs (e.g., five or more) away from the uplink cellular resources 208 to allow for up to a full transmit power level for D2D discovery. In some embodiments, a small transmit power level offset may be used for the transmission of a discovery signal 101 on RBs that are at least a predetermined number of RBs away from the uplink cellular resources 208 to allow for up to a full transmit power level for D2D discovery. In some of these embodiments, the D2D transmissions that occur relatively "distant" from the UL cellular transmissions in the frequency domain need not be subjected to unnecessary transmit power back-off which may occur when "flat" open loop power control is implemented (i.e., transmit power control that is based on the path loss between transmitting ProSe-enabled UE and an eNodeB). In these embodiments less transmit power restrictions may be more desirable for D2D discovery signal transmission and for D2D broadcast communication performance to allow D2D signals to be received by as many neighboring UEs as possible. This maybe particular beneficial when considering public safety use cases. When a UE 102 is communicating with an eNB 104, closed loop power control may be applied to PUSCH and PUCCH transmissions on top of open-loop power control via dynamic signaling of TPC commands that depend on the modulation and coding scheme (MCS) of the transmissions used to achieve a target block error rate (BLER), although the scope of the embodiments is not limited in this respect.

In some embodiments, a ProSe-enabled UE 102 may receive signaling from an eNB 104 indicating an allocation of the discovery resources for D2D discovery. The discovery resources 206 allocated for D2D discovery and D2D communication may comprise one or more physical resource blocks that are within the discovery zone 204. The signaling may also indicate the transmit power level offset at least when a transmit power level offset is to be used, although in some embodiments, the UE 102 may determine transmit power level offset.

In some embodiments, discovery resources may also be allocated for D2D communication and may comprise one or more PRBs that are within a D2D communication zone (i.e., a resource pool for D2D communications). In some embodiments, the D2D communication zone may share resources with the discovery zone 204, although that is not a requirement.

In some of these embodiments, signaling from an eNB 104 may include an indication not to use a transmit power level offset when a transmit power level offset is not to be used. In some alternate embodiments, the signaling may not have any indication to use a transmit power level offset when a transmit power level offset is not to be used, although the scope of the embodiments is not limited in this respect.

In some embodiments, the discovery zone 204 may be periodic in time (i.e., repeat) and may have a frequency span of substantially the system bandwidth 202 except for the band edges that are reserved for at least a control channel (e.g., the PUCCH 208A). In some of these embodiments, all resources except for resources allocated to the PUCCH at the band edges may be allocated for D2D discovery and communication, although the scope of the embodiments is not limited in this respect. In these embodiments, uplink cellular transmissions may be frequency-division multiplexed (FDM) with the D2D transmissions as illustrated in FIGS. 2B and 2C.

In some example embodiments, the transmit power level offset may be one of a plurality of predetermined transmit power level offsets. In these embodiments, a first transmit power level offset ($\Delta_1$) is set for RBs of the discovery zone 204 that are adjacent to (e.g., within $M_1$ RBs where $M_1=0$ the RBs right next to the UL WAN RBs) an uplink WAN region comprising the uplink cellular resources 208, a second transmit power level offset ($\Delta_2$) is set for RBs of the discovery zone that are a predetermined number $M_2$ RBs away (with $M_2>0$) from the UL WAN region, a third transmit power level offset ($\Delta_3$) is set for RBs of the discovery zone that are a predetermined number $M_3$ RBs away (with $M_3>M_2$) from the UL WAN region, a fourth transmit power level offset ($\Delta_4$) is set for RBs of the discovery zone that are a predetermined number $M_4$ RBs away (with $M_4>M_3$) from the UL WAN region, a fifth transmit power level offset ($\Delta_0$) is set for RBs of the discovery zone that are a predetermined number $M_5$ or more RBs away (with $M_5>M_4$) from the UL WAN region. In these embodiments, the first transmit power level offset ($\Delta_1$) may be the greatest offset to provide a lower or lowest transmit power. The fifth power level offset ($\Delta_0$) may be the smallest offset (e.g., possibly zero) to provide the higher or highest transmit power. In some embodiments, the transmit power level offsets may be preconfigured within a UE 102, while in other embodiments, transmit power level offsets may be selected or configured by an eNB 104. Although these example embodiments provide five power level offsets, the scope of the embodiments is not limited in this respect as embodiments disclosed herein are applicable to different numbers of power level offsets.

In some embodiments, signaling from the eNB 104 may include D2D discovery zone configuration signaling to indicate time and frequency resources and a periodicity of the discovery zone 204 and one or more discovery zone operational parameters, although the scope of the embodiments is not limited in this respect. The discovery zone operational parameters may include at least one of a silencing factor and a transmit power control configuration. In these embodiments, a ProSe-enabled UE may be configured to transmit discovery signals within the indicated resources to be discovered by one or more other ProSe-enabled UEs. The silencing factor may be used to control the probability of transmission in the discovery zone 204 and may be combined with transmit power control. These embodiments are described in more detail below.

In some embodiments, the discovery zone operational parameters may also include hopping related parameters and a scrambling ID, although the scope of the embodiments is not limited in this respect. In some embodiments, the discovery signal 101 may be a discovery packet and may be configured in accordance with a predetermined configuration to have at least a discovery payload and a cyclic-redundancy check (CRC). The discovery payload may include discovery-related content, although the scope of the embodiments is not limited in this respect.

As mentioned above, in some embodiments, the transmit power for D2D discovery and D2D communication may be based at least in part on the path loss between the UE and an eNB 104. These embodiments may help protect uplink WAN reception at the eNB 104. In these embodiments, the path loss between an eNB and UEs may be represented as PL and the transmit power for D2D discovery may be represented as $P_{D2D}(i_{PRB})$, where $i_{PRB}$ is the PRB index for D2D discovery and $i_{PRB} \in \{N_{RB}^{WAN}/2, N_{RB}^{WAN}/2+1, \ldots N_{RB}^{UL}-N_{RB}^{WAN}/2-1\}$.

In some embodiments, the transmit power for D2D discovery may be set in accordance with the following:

If $i_{PRB} \in \{N_{RB}^{WAN}/2, N_{RB}^{UL}-N_{RB}^{WAN}/2-1\}$;

$P_{D2D}(i_{PRB})=\min \{P_{CMAX,c}, P_{0\_D2D}+PL+\Delta_1\}(dBm)$

If $i_{PRB} \in \{N_{RB}^{WAN}/2+1, N_{RB}^{UL}-N_{RB}^{WAN}/2-2\}$;

$P_{D2D}(i_{PRB})=\min \{P_{CMAX,c}, P_{0\_D2D}+PL+\Delta_2\}(dBm)$

If $i_{PRB} \in \{N_{RB}^{WAN}/2+2, N_{RB}^{UL}-N_{RB}^{WAN}/2-3\}$, $P_{D2D}(i_{PRB})=\min \{P_{CMAX,c}, P_{0\_D2D}+PL+\Delta_3\}(dBm)$ If $i_{PRB} \in \{N_{RB}^{WAN}/2+3, N_{RB}^{UL}-N_{RB}^{WAN}/2-4\}$;

$P_{D2D}(i_{PRB})=\min \{P_{CMAX,c}, P_{0\_D2D}+PL+\Delta_4\}(dBm)$

If $N_{RB}^{WAN}/2+4 \leq i_{PRB} \leq N_{RB}^{UL}-N_{RB}^{WAN}/2-5$, $P_{D2D}(i_{PRB})=\min \{P_{CMAX,c}, P_{0\_D2D}+PL+\Delta_0\}(dBm)$ Where $P_{CMAX,c}$ is the configured UE transmit power, which may be defined in 3GPP TS 36.213, although that is not a requirement.

$P_{0\_D2D}$ may be a cell-specific parameter configured by the network (e.g., an eNB) as part of the discovery zone 204 or D2D data region configuration via SIB signaling (SIB-1 or SIB-2; in general, common RRC signaling) that may be set appropriately to control the maximum transmission power for the ProSe-enabled UEs. In the absence of the parameters $\Delta_k$, k={0, . . . , 4} (explained below), it may be interpreted as a received power target for the D2D discovery transmissions at the eNB, although the scope of the embodiments is not limited in this respect. In some other embodiments in which the UL WAN region only comprises PUCCH resources, this parameter may be same as the cell-specific parameter $P_{O\_NOMINAL\_PUCCH}$ provided by RRC signaling and may be applied for Type 2 (Type 2A or Type 2B) D2D discovery resources assuming that only RRC_CONNECTED UEs are allowed to transmit on Type 2 (2A or 2B) resources.

$\Delta_k$, k={0, . . . , 4} represent the respective transmit power offsets. In some embodiments, the set of power offsets may be predefined or broadcast by an eNB as part of the D2D discovery zone or D2D data region configuration via common RRC signaling (e.g., SIB signaling). In some embodiments, the signaling of these power offsets may be defined using ranges for each parameter (as is done for SRS power offsets), although this is not a requirement as the signaling of these power offsets may be or may done explicitly.

In some alternate embodiments, considering transmissions on Type 2 (2A or 2B) discovery resources that are scheduled by the eNB 104 for RRC_CONNECTED UEs, the transmit power offsets may be indicated in a UE-specific manner as part of the RRC signaling used to configure Type 2B resources or using Layer 1 signaling for Type 2A or even Type 2B resources. These embodiments may allow for a finer tuning for transmit power control from the eNB 104 by the latter exploiting the knowledge of the transmission PRBs for the scheduled UEs 102.

A different number of power offsets may be straightforwardly expanded and supported based on the above example. In these embodiments, both RRC_CONNECTED and RRC_IDLE ProSe-enabled UEs may be configured to measure the path-loss between the eNB 104 and the UE before D2D discovery signal transmissions.

Some embodiments may further reduce the signaling overhead. In these embodiments, an eNB 104 may broadcast a single power offset parameter (e.g., $\Delta$) for use with a set of predefined multipliers $c_k$. In these embodiments, the transmit power level may be defined as follows:

If $i_{PRB} \in \{N_{RB}^{WAN}/2, N_{RB}^{UL} - N_{RB}^{WAN}/2 - 1\}$;

$P_{D2D}(i_{PRB}) = \min\{P_{CMAX,c}, P_{0\_D2D} + PL + \Delta + c_1\}(dBm)$

If $i_{PRB} \in \{N_{RB}^{WAN}/2 + 1, N_{RB}^{UL} - N_{RB}^{WAN}/2 - 2\}$;

$P_{D2D}(i_{PRB}) = \min\{P_{CMAX,c}, P_{0\_D2D} + PL + \Delta + c_2\}(dBm)$

If $i_{PRB} \in \{N_{RB}^{WAN}/2 + 2, N_{RB}^{UL} - N_{RB}^{WAN}/2 - 3\}$;

$P_{D2D}(i_{PRB}) = \min\{P_{CMAX,c}, P_{0\_D2D} + PL + \Delta + c_3\}(dBm)$

If $i_{PRB} \in \{N_{RB}^{WAN}/2 + 3, N_{RB}^{UL} - N_{RB}^{WAN}/2 - 4\}$, $P_{D2D}(i_{PRB}) = \min\{P_{CMAX,c}, P_{0\_D2D} + PL + \Delta + c_4\}(dBm)$ If $N_{RB}^{WAN}/2 + 4 \leq i_{PRB} \leq N_{RB}^{UL} - N_{RB}^{WAN}/2 - 5$, $P_{D2D}(i_{PRB}) = \min\{P_{CMAX,c}, P_{0\_D2D} + PL + \Delta + c_0\}(dBm)$ In these embodiments, the eNB 104 may broadcast a single power offset parameter $\Delta$. The multipliers $c_k$, k={0, . . . , 4} may be predefined and known by the UEs 102.

As mentioned previously, in some embodiments, a ProSe-enabled UE 102 is configured to transmit the discovery signal 101 in accordance with a silencing factor. In these embodiments, the silencing factor may correspond to a transmission probability that the UE will transmit the discovery signal 101 within a current occurrence of the discovery zone 204. In these embodiments, interference and collisions in the discovery zone 204 may be controlled by controlling the probability of transmission of D2D discovery signals in a distributed fashion based on a transmission probability as part of the D2D discovery zone configuration. In these embodiments, whether or not the UE 102 transmits a discovery signal 101 may be based on the probability of transmission associated with the silencing factor. In these embodiments, when the UE 102 does transmit, a discovery signal 101 may be transmitted at a power level that is based on a transmit power level offset which is based on the relative location of the discovery resources 206 with respect to the uplink cellular resources 208.

In some embodiments, the silencing factor may be configured to provide at least one of: a higher transmission probability for lower transmit power levels and a lower transmission probability for higher transmit power levels, although the scope of the embodiments is not limited in this respect. In these embodiments, the use of a silencing factor may help control collisions which is enhanced with TPC in which a UE may increase or decrease transmission power for D2D signals in predefined steps according to a level related to the silencing factor. In some embodiments, no transmit power level offset (i.e., a transmit power back off) is applied when the silencing factor is below a predetermined value (e.g., 25%). In some of these embodiments, the transmit power level offset may be modified based on the silencing factor. For example, a transmit power level may be used with a reduced transmission probability to increase the probability that a D2D discovery signal may be received. In some embodiments, the silencing factor may be determined by the eNB and may be based at least in part on loading conditions (e.g., to reduce interference).

In some embodiments, when a UE does not actually transmit during a particular occurrence of the discovery zone 204 due to the silencing factor, the UE may refrain from determining a transmit power level offset for transmission of a discovery signal (i.e., application of TPC would be moot).

When a UE 102 is not configured to transmit the discovery signal 101 in accordance with a silencing factor, the UE 102 may be configured to further determine the transmit power offset (power back-off) based at least in part on interference and/or a loading condition of the discovery zone 204 or the data communication resource pool. In these embodiments, the UE 102 may monitor the interference and loading conditions of the discovery zone 204 or data communication resource pool. The interference and loading conditions may be compared against one or more thresholds to determine the transmit power back off. The one or more thresholds may be preconfigured in the UE 102 or may be configured by the serving or camping eNB.

In some embodiments, when a UE 102 is not configured to transmit the discovery signal 101 in accordance with a silencing factor (i.e., in the absence of a random silencing mechanism) a UE may monitor the D2D discovery zones on subframes that it is not transmitting on to observe loading of the discovery zone. Based on the observed loading, a UE 102 may reduce or increase the transmit power by predefined steps compared to the transmit power level in the current discovery zone for transmissions in a subsequent discovery zone.

In some embodiments, the loading condition may be determined based, at least in part, on a fraction of the discovery or communication resources occupied with the resource pool. In some embodiments, a ProSe-enabled UE 102 may perform blind energy detection on demodulation reference signals to identify the communication resources occupied with the resource pool. For example, predefined power backoff values may be applied to a discovery zone depending on different ranges of occupancy detected within a previous discovery zone.

While the use of a silencing factor as discussed above may help in controlling collisions effectively, it may be enhanced further by specifying a TPC mechanism by which UEs reduce/increase their transmission power by predefined steps according to the level of the configured silencing factor. In these embodiments, for a silencing factor less than a predetermined value (e.g., 25% (i.e., UEs transmit with a 75% probability)), UEs may be configured to not apply any power backoff, however, if the silencing factor is greater than a predetermined value (e.g., between 25% and 50%,) UEs may be configured apply some transmit power backoff (e.g., a 0.5 dB), etc.

In some embodiments, a UE 102 may be configured to perform adaptive silencing. In these embodiments, a ProSe-enabled UE 102 may be configured with a nominal silencing factor which may be adapted in a distributed and UE-specific manner depending on whether or not a UE transmitted in the previous discovery zone. For adaptive silencing, the above TPC mechanism may be modified to adapt in the similar way but in the inverse direction as the UE-specific silencing factor. For example, as the silencing factor is increased/decreased compared to the value in the previous discovery zone, the transmit power is reduced/increased respectively by a predefined step compared to the transmit power that was selected for the previous discovery zone. Such a TPC mechanism may, for example, be implemented to act in a supplementary fashion to the application of random silencing and may be operate as a "fine tuning" parameter for controlling of the interference level within the discovery zone while random silencing factor acts as the "coarse control" factor.

In some embodiments, eNBs 104 may monitor the resource occupancy levels more closely and may avoid scheduling some UEs on central PRB(s) of the discovery zone 204 for discovery signal transmission. In these embodiments, the accumulated interference at D2D receivers from carrier leakage can be severe on the central PRB(s) (e.g., the PRB containing the DC subcarrier for system bandwidths with an odd number of PRBs and the two central PRBs adjacent to the DC subcarrier for system bandwidths with an even number of PRBs). This can be the case especially if the discovery zone 204 *is heavily loaded with discovery signal transmission, and can be accentuated further for those subframes wherein mostly cell-edge UEs transmit UL WAN transmissions (PUCCH, PUSCH, etc.) with power being controlled to the eNB on the UL WAN resources that coexist with the D2D discovery zone resources.

Consequently, this can significantly impact the number of ProSe-enabled UEs that can successfully receive the discovery signals transmitted on these resources, thereby reducing the probability of being discovered for UEs that choose to transmit on these resources, leading to degraded performance not only for the aforementioned UEs but also to UEs transmitting on neighboring resources via in-band emissions (note that the UEs transmitting on central PRBs can be expected to transmit with comparatively higher transmit power even with the proposed TPC mechanism to control interference to UL WAN resources). In some embodiments, transmissions on the central PRB(s) may be prohibited and may be configurable with SIB signaling. Additionally, for Type 2 resources, eNBs may be configured monitor the resource occupancy levels to avoid scheduling UEs on the central PRB(s) for discovery signal transmission, although the scope of the embodiments is not limited in this respect.

Figure 3:
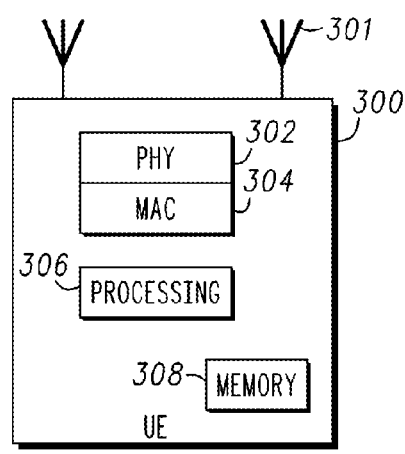
FIG. 3 illustrates a functional block diagram of a UE in accordance with some embodiments.

FIG. 3 illustrates a functional block diagram of a UE in accordance with some embodiments. The UE 300 may be suitable for use as any one or more of the UEs 102 illustrated in FIG. 1, including UE 112 and UE 114. The UE 300 may include physical layer (PHY) circuitry 302 for transmitting and receiving signals to and from eNBs 104 (FIG. 1) using one or more antennas 301 as well as for D2D communications with other UEs and may be configured as a ProSe-enabled UE. UE 300 may also include medium access control layer (MAC) circuitry 304 for controlling access to the wireless medium. UE 300 may also include processing circuitry 306 and memory 308 arranged to configure the various elements of the UE 300 to perform the various operations described herein.

In accordance with some embodiments, the UE 300, while in either RRC idle or RRC connected mode, may be configured to transmit a discovery signal 101 (FIG. 1) to discover another UE as described herein and receive responses to the discovery signal 101 from other UEs. The UE 300 may also be configured to monitor and attempt to decode a received discovery packet that is transmitted in the discovery zone 204 (FIGS. 2A, 2B and 2C) by another UE for discovery by the other UE. The UE 300 may also be arranged to establish a D2D connection with another UE after either discovering the other UE or after being discovered by another UE. The channel resources for the D2D discovery and the D2D connection may be assigned by the eNB 104, although this is not a requirement. In accordance with embodiments, the UE 300 may configure a discovery signal for transmission on discovery resources allocated for D2D discovery for transmission at a transmit power level based on a relative location of the discovery resources with respect to uplink cellular resources in the frequency domain.

In some embodiments, the UE 300 may a portable wireless communication device or a mobile device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the UE 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 4:
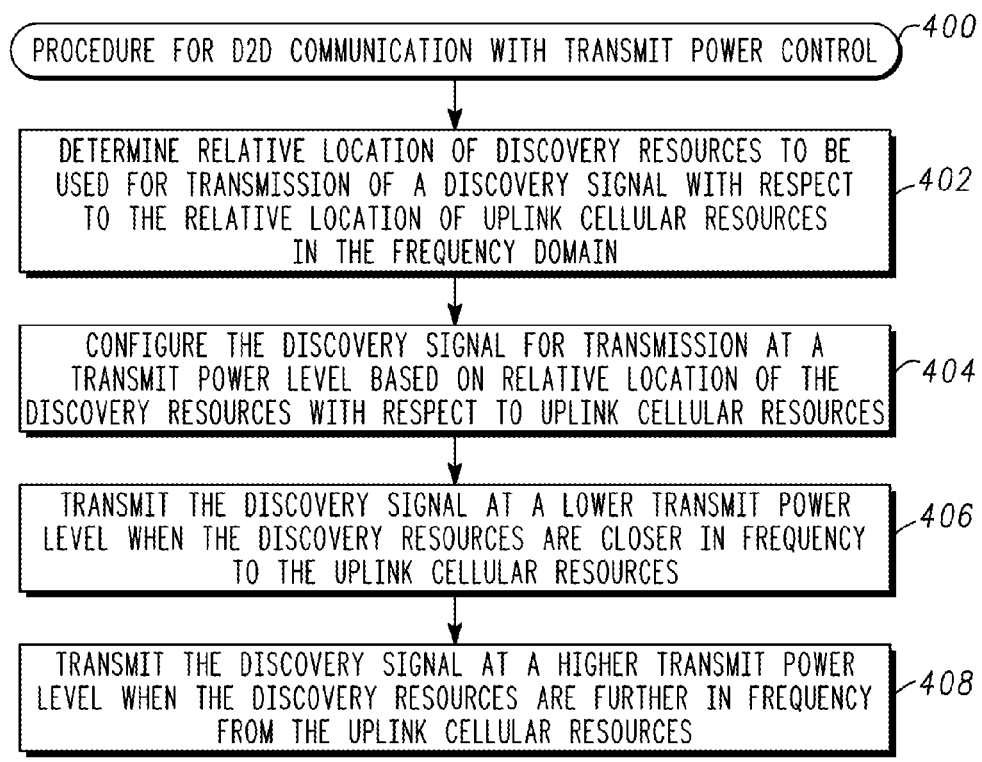
FIG. 4 is a procedure for D2D communication with TPC in accordance with some embodiments.

FIG. 4 is a procedure for D2D communication with TPC in accordance with some embodiments. Procedure 400 may be performed by a ProSe-enabled UE, such as UE 102 (FIG. 1) or UE 300 (FIG. 3).

Operation 402 may comprise determining the relative location of discovery resources to be used for transmission of a discovery signal with respect to uplink cellular resources in the frequency domain relative location in the frequency domain. In some of these embodiments, operation 402 would not need to be performed by the UE when the transmit power level or the transmit power back off value is predetermined or provided by the eNB, although the scope of the embodiments is not limited in this respect. In some of these embodiments, operation 402 may be performed by an eNB to determine the transmit power level or the transmit power back off value.

Operation 404 may comprise configuring a discovery signal for transmission at a transmit power level based on a relative location of the discovery resources with respect to uplink cellular resources. In some embodiments, the transmit power back off value may be determined by the UE based on a relative location of the discovery resources with respect to uplink cellular resources. In some embodiments, the transmit power level or the transmit power back off value may be provided by the eNB (e.g., indicated by the eNB when the discovery resources are allocated). In some embodiments, the transmit power level or the transmit power back off value may be predetermined depending on the location of the discovery resources.

Operation 406 comprises transmitting a discovery signal at a lower transmit power level when the discovery resources are closer in frequency to the uplink cellular resources. Operation 408 comprises transmitting a discovery signal at a higher transmit power level when the discovery resources are further in frequency from the uplink cellular resources. The UE may also be configured to perform other operations including other operations for TPC described herein.

Figure 5:
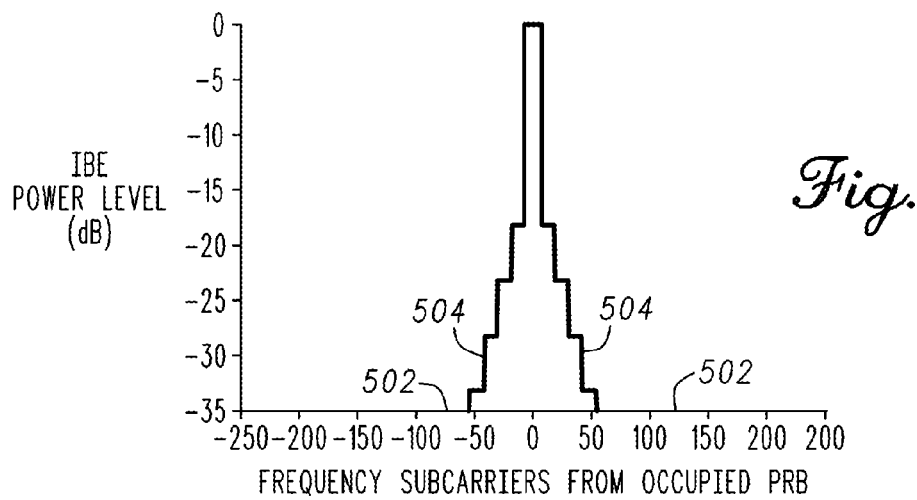
FIG. 5 illustrates an example of the power level for a general component of IBE vs separation in the frequency domain.

FIG. 5 illustrates an example of the power level for a general component of IBE vs separation in the frequency domain Some embodiments for TPC disclosed herein are based on the observation that interference leaking into unoccupied PRBs is at different levels for the neighboring few PRBs 504 and beyond a certain number of PRBs they saturate to a "floor" 502. For example, a few PRBs (e.g., 3~5 PRBs 504) may be affected by significantly different levels of general IBE and thus the same level of transmit power control need not be applied for all PRBs occupying the discovery zone 204 or the D2D data region. The D2D transmissions further away from the uplink cellular resources (e.g., occupying the central PRBs of the spectrum) may have minimal impact on the uplink cellular resources from IBE as compared to the PRBs right next to the UL WAN regions as shown in FIG. 5.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) enabled for proximity services (ProSe) configured for device-to-device (D2D) discovery operations and D2D communication in a cellular network, the UE comprising:
    physical-layer (PHY) circuitry to transmit a discovery signal; and
    processing circuitry to:
        configure the discovery signal for transmission on discovery resources allocated for D2D discovery,
        wherein the discovery signal is configured to be transmitted at a transmit power level based on a relative location of the discovery resources with respect to uplink cellular resources in the frequency domain, and
        wherein the discovery signal is configured to be transmitted at a lower transmit power level on the discovery resources that are closer in frequency to the uplink cellular resources and at a higher transmit power level on the discovery resources that are further in frequency from the uplink cellular resources.

2. The ProSe-enabled UE of claim 1 wherein the transmit power level is reduced in accordance with a transmit power level offset that is based at least in part on a number of resource blocks (RBs) from the uplink cellular resources,
    wherein the transmit power level is further based at least in part on a path loss between the UE and an enhanced Node B (eNB) that is measured prior to transmission of the discovery signal, and
    wherein the uplink cellular resources include resources allocated to one or more of a physical uplink control channel (PUCCH), a physical uplink shared channel (PUSCH) and a physical random access channel (PRACH).

3. The ProSe-enabled UE of claim 2 further configured to:
    receive signaling from an eNB indicating an allocation of the discovery resources for D2D discovery,
    wherein the discovery resources allocated for D2D discovery and D2D communication comprise one or more physical resource blocks that are within a discovery zone,
    wherein the discovery zone is a resource pool comprising the discovery resources, and
    wherein the signaling indicates the transmit power level offset when a transmit power level offset is to be used.

4. The ProSe-enabled UE of claim 3 wherein the discovery resources are allocated by the eNB on a UE-specific matter.

5. The ProSe-enabled UE of claim 3 wherein the discovery zone is periodic and has a frequency span of substantially the system bandwidth except for band edges that reserved for at least a control channel.

6. The ProSe-enabled UE of claim 3 wherein the discovery resources allocated for D2D discovery and D2D communication are within the discovery zone, wherein the transmit power level offset is one of a plurality of transmit power level offsets, wherein a first transmit power level offset ($\Delta_1$) is set for RBs of the discovery zone that are adjacent to an uplink WAN region comprising the uplink cellular resources, a second transmit power level offset ($\Delta_2$) is set for RBs of the discovery zone that are a predetermined number $M_2$ RBs away (with $M_2 > 0$) from the UL WAN region, a third transmit power level offset ($\Delta_3$) is set for RBs of the discovery zone that are a predetermined number $M_3$ RBs away (with $M_3 > M_2$) from the UL WAN region, a fourth transmit power level offset ($\Delta_4$) is set for RBs of the discovery zone that are a predetermined number $M_4$ RBs away (with $M_4 > M_3$) from the UL WAN region, and a fifth transmit power level offset ($\Delta_0$) is set for RBs of the discovery zone that are a predetermined number $M_5$ or more RBs away (with $M_5 > M_4$) from the UL WAN region.

7. The ProSe-enabled UE of claim 3, wherein the signaling from the eNB comprises D2D discovery zone configuration signaling to indicate time and frequency resources and a periodicity of the discovery zone and one or more discovery zone operational parameters, wherein the discovery zone operational parameters include at least one of a silencing factor and a transmit power control configuration, and wherein the UE is further configured to transmit discovery signals within the indicated resources to be discovered by one or more other ProSe-enabled UEs.

8. The ProSe-enabled UE of claim 2 wherein the UE is configured to transmit the discovery signal in accordance with a silencing factor, wherein the silencing factor corresponds to a transmission probability that the UE will transmit the discovery signal within a current occurrence of a discovery zone.

9. The ProSe-enabled UE of claim 8 wherein the silencing factor is configured to provide at least one of:

a higher transmission probability for lower transmit power levels, and a lower transmission probability for higher transmit power levels.

10. The ProSe-enabled UE of claim 2 wherein when the UE is not configured to transmit the discovery signal in accordance with a silencing factor, the UE is configured to further determine the transmit power offset based at least in part on interference and/or a loading condition of the discovery resources.

11. The ProSe-enabled UE of claim 10 wherein the loading condition is based, at least in part, on a fraction of the discovery or communication resources occupied, and wherein the UE is configured to perform a blind energy detection on demodulation reference symbols (DM-RS) to identify the communication resources occupied with the resource pool.

12. User Equipment (UE) enabled for proximity services (ProSe) configured for device-to-device (D2D) discovery operations and D2D communication in a cellular network, the UE comprising:

physical-layer (PHY) circuitry to transmit a discovery signal; and processing circuitry to:

configure the discovery signal for transmission on discovery resources allocated for D2D discovery, wherein the discovery signal is configured to be transmitted at a transmit power level based on a relative location of the discovery resources with respect to uplink cellular resources in the frequency domain, and wherein no transmit power level offset is used for the transmission of the discovery signal on resource blocks (RBs) that are at least a predetermined number of RBs away from the uplink cellular resources to allow for up to a full transmit power level for D2D discovery.

13. A method performed by user equipment (UE) for transmit power control, the UE enabled for proximity services (ProSe) and configured for device-to-device (D2D) discovery operations and D2D communication in a cellular network, the method comprising:

configuring a discovery signal for transmission on discovery resources from a configured resource pool for D2D discovery, wherein the discovery signal is configured to be transmitted at a transmit power level based on a relative location of the discovery resources with respect to uplink cellular resources in the frequency domain, and wherein the discovery signal is configured to be transmitted at a lower transmit power level on the discovery resources that are closer in frequency to the uplink cellular resources and at a higher transmit power level on the discovery resources that are further in frequency from the uplink cellular resources.

14. The method of claim 13 wherein the method further comprises:

reducing the transmit power level in accordance with a transmit power level offset that is based at least in part on a number of resource blocks (RBs) from the uplink cellular resources; and setting the transmit power level based at least in part on a path loss between the UE and an enhanced Node B (eNB) that is measured prior to transmission of the discovery signal, wherein the uplink cellular resources include resources allocated to one or more of a physical uplink control channel (PUCCH), a physical uplink shared channel (PUSCH) and a physical random access channel (PRACH).

15. The method of claim 14 further comprising measuring the path loss to the eNB before transmitting the discovery signal.

16. The method of claim 13 further comprising:

receiving a single power offset parameter from an enhanced Node B (eNB) for use with a set of predefined multipliers for determining a transmit power level offset; and setting the transmit power level based on the transmit power level offset, wherein the multipliers are selected based on a number of RBs away from the uplink cellular resources.

17. A non-transitory computer-readable storage medium that stores instructions for execution by one or more processors of user equipment (UE) for transmit power control, the UE enabled for proximity services (ProSe) and configured for device-to-device (D2D) discovery operations and D2D communication in a cellular network, the operations to cause to UE to:

configure a discovery signal for transmission on discovery resources from a configured resource pool for D2D discovery, wherein the discovery signal is configured to be transmitted at a transmit power level based on a relative location of the discovery resources with respect to uplink cellular resources in the frequency domain, and wherein the discovery signal is configured to be transmitted at a lower transmit power level on the discovery resources that are closer in frequency to the uplink cellular resources and at a higher transmit power level on the discovery resources that are further in frequency from the uplink cellular resources.

18. An enhanced Node B (eNB), comprising at least one processor and physical layer circuitry, the at least one processor configured to:

transmit, using the physical layer circuitry, signaling to user equipment (UE) indicating an allocation of discovery resources for device-to-device (D2D) discovery, wherein the discovery resources allocated for D2D discovery comprise one or more resource blocks that are within a discovery zone, wherein the signaling indicates a transmit power level offset that is based on a relative location of the discovery resources with respect to uplink cellular resources in the frequency domain, and wherein the discovery signal is configured to be transmitted at a lower transmit power level on the discovery resources that are closer in frequency to the uplink cellular resources and at a higher transmit power level on the discovery resources that are further in frequency from the uplink cellular resources.

19. The eNB of claim 18 further configured to broadcast a single power offset parameter for use with a set of predefined multipliers for use by the UE to determine the transmit power level offset, wherein the multipliers are selected based on a number of resource blocks away from the uplink cellular resources.

20. An enhanced Node B (eNB), comprising at least one processor and physical layer circuitry, the at least one processor configured to:

transmit, using the physical layer circuitry, signaling to user equipment (UE) indicating an allocation of discovery resources for device-to-device (D2D) discovery, wherein the discovery resources allocated for D2D discovery comprise one or more resource blocks that are within a discovery zone, wherein the signaling indicates a transmit power level offset that is based on a relative location of the discovery resources with respect to uplink cellular resources in the frequency domain, and wherein the eNB is further configured to transmit a transmit-power control (TPC) command to the UE as part of downlink control information (DCI) on a control channel, the TPC included in a scheduling assignment of the discovery resources within the discovery zone.

* * * * *

UNITED STATES PATENT AND TRADEMARK OFFICE
CERTIFICATE OF CORRECTION

| | | |
|---|---|---|
| PATENT NO. | : 9,560,574 B2 | Page 1 of 1 |
| APPLICATION NO. | : 14/482060 | |
| DATED | : January 31, 2017 | |
| INVENTOR(S) | : Chatterjee et al. | |

It is certified that error appears in the above-identified patent and that said Letters Patent is hereby corrected as shown below:

On the Title Page

In item (54), and in the Specification, Column 1, Line 3, in "Title", delete "TRANMISSIONS" and insert --TRANSMISSIONS-- therefor Signed and Sealed this
Fourth Day of June, 2019

Andrei Iancu
*Director of the United States Patent and Trademark Office*